UNITED STATES PATENT OFFICE.

LYMAN GUINNIP, OF CHICAGO, ILLINOIS.

ART OF MAKING BUTTER.

SPECIFICATION forming part of Letters Patent No. 334,430, dated January 19, 1886.

Application filed May 22, 1885. Serial No. 166,422. (No specimens.)

*To all whom it may concern:*

Be it known that I, LYMAN GUINNIP, a citizen of the United States, and residing in the city of Chicago, Cook county, and State of Illinois, have invented a new and useful Improvement in Making Butter; and I hereby declare that the following is a full, clear, and exact description of my invention.

Heretofore butter has been made by mixing cream and milk of indiscriminate ages, paying no regard to chemical processes that were going on in each separate pan or body of milk or cream.

The object of my invention is to make more butter from the same quantity of cream than can be made by any other process; and to this end I extract all of the properties of the milk.

To make butter by my process, I take, say, one gallon of cream, keep it in temperature of 60° to 64° for thirty-six hours, or so that it will clabber; take another gallon of cream, keep in same temperature twenty-four hours; put both into a churn and churn one minute. Then turn out one-third of the mixture and put one pound of butter into this one-third and stir well and let it stand, while you continue churning the two-thirds remaining until seeds of butter appear; then add or put in eight pounds of butter and churn four minutes; then return the one-third which you had previously taken out and churn the whole until butter is made.

If you desire to color the butter, this should be done just before you cease churning.

To make butter from milk only, you follow the same process and keep the proportions the same. I use no chemicals whatsoever, and make the butter pure and sweet from milk or cream only. The butter put into the churn, if it be of an inferior quality, will come out vastly improved, the rancid part disappearing with the water of the milk.

What I claim as new, and desire to secure by Letters Patent, is—

The process herein described of making butter, the same consisting in mingling two bodies of cream of different age, then churning the same, then removing a portion thereof from the churn and mingling with the removed part a quantity of butter, then churning the residue until butter begins to separate, then adding butter thereto, as specified, and churning the mixture, and finally adding thereto the portion first abstracted and churning the whole until the butter is made, the proportions employed being substantially as specified.

LYMAN GUINNIP.

Witnesses:
L. H. WHITNEY,
J. R. DAVIS,
WM. KRUNMARCK.